FEED SAVER FOR AUTOMATIC FEED APPARATUS

Original Filed Jan. 18, 1965

INVENTOR.
ROBERT L. VAN HUIS

BY Price & Heneveld

ATTORNEYS

United States Patent Office

Re. 27,035
Reissued Jan. 19, 1971

27,035
FEED SAVER FOR AUTOMATIC FEED APPARATUS

Robert L. Van Huis, Zeeland, Mich., assignor, by mesne assignments, to U.S. Industries, Inc., New York, N.Y., a corporation of Delaware Original No. 3,272,400, dated Sept. 13, 1966, Ser. No. 426,154, Jan. 18, 1965. Application for reissue Aug. 13, 1968, Ser. No. 768,205
Int. Cl. B65g *47/18*
U.S. Cl. 222—318 16 Claims

Matter enclosed in heavy brackets [ ] appears in the original patent but forms no part of this reissue specification; matter printed in italics indicates the additions made by reissue.

*ABSTRACT OF THE DISCLOSURE*

*A feed saver apparatus for returning unused feed to a hopper, the apparatus featuring a cylindrical compacting element located at least partially within a feed hopper and at a predetermined height above the level of incoming unused feed, means such as the feed chain for driving the compacting element in a rotary manner so as to compact returning unused feed which is at a height above the predetermined height of the compacting element. Means are provided for moving the compacted returning feed upward into the hopper and for effectively shielding the upper and rear portions of the compacting element so as to prevent feed in the hopper from returning to the trough upstream from the hopper.*

Figure 1:
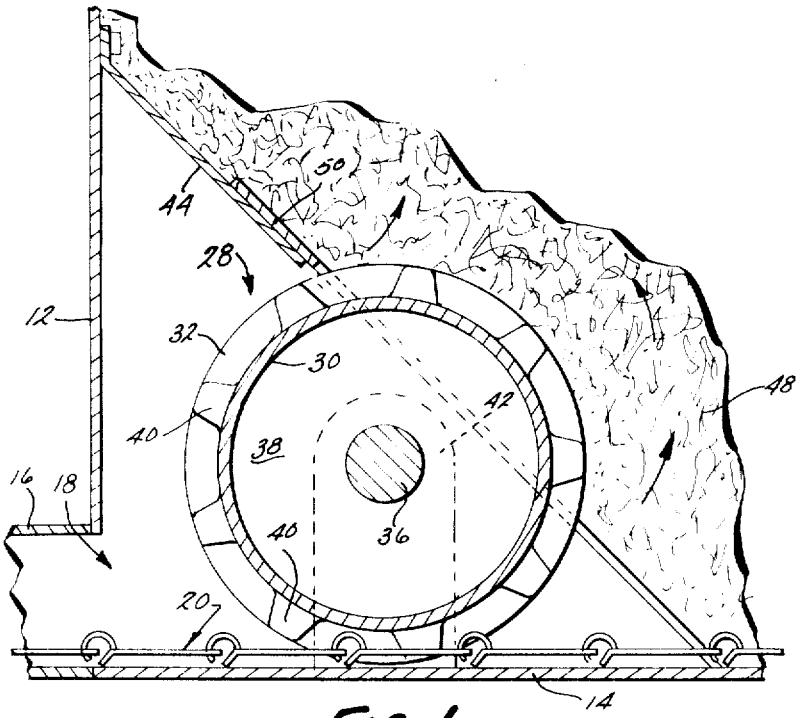

This invention relates to automatically operated feeding equipment, and more particularly to a new and unique hopper apparatus by which unconsumed still feed in the trough of the feeder when it re-enters the hopper may be reintroduced back into the hopper and mixed with the feed already there, in an efficient and expeditious manner which prevents the spilling and wasting of such feed.

As is well known, in the automatic feeding of poultry or other animals, one or more feeding troughs having conveying means of various types within the trough are used to continuously supply feed from a supply hopper throughout the length of the trough. The conveyor means typically moves at a very slow rate, and the birds or animals consume the feed as it is slowly moved past them in the trough. The total quantity of feed which a given group of birds may eat in any given time will naturally vary from the amount eaten by the same group in other like periods of time, depending upon many different factors. As a result, the conveying apparatus at times returns to the hopper with very little or no feed remaining, while at other times it returns with a great deal of feed.

The latter instance has always created a problem. The continuous successful operation of such an automatic system depends upon the presence within the hopper of a large supply of bulk feed which constantly settles to the bottom of the hopper, toward the point where the conveyor passes through it, to continuously load the conveyor so that it may always leave the hopper with a fresh supply of feed. Consequently, feed remaining on the conveyor as it re-enters the hopper at its inlet is met by the mass of feed present in the hopper. This causes the feed remaining in the conveyor to pile up at the inlet to the hopper and, since the conveyor operates practically continuously, the feed attempting to re-enter the hopper soon begins to spill out of the trough, and it is wasted. This represents a very real and appreciable loss to the operator.

Several devices have been suggested for overcoming this problem. It was an early conventional practice to completely remove from the conveyor trough whatever feed was returned to the hopper, as by forming an opening in the bottom of the trough at a point just before the conveyor re-enters the hopper. This feed was elevated by a separate means, which then discharged it back into the top of the hopper. This system works quite satisfactorily and is used to some extent today, but it involves considerable additional equipment and materially increases the expense of the system. A later device was that suggested by Graetz in his U.S. Patent No. 2,589,690, which was said to control the amount of feed leaving the hopper outlet at a predetermined desired level while also preventing feed from backing up at the hopper inlet. However, it is the experience of the present inventor that this system contained a seemingly inherent tendency to consistently jam, thereby causing a problem of greater aggravation than the original problem.

A more recent and more successful solution to the problem is shown in a patent issued to M. L. Smal'egan, No. 2,866,536, and assigned to the assignee of the present invention. This device consists of certain feed return gates which compress the feed as it enters the hopper. This act to positively prevent both the compressed feed and the loose bulk feed in the hopper form backing up within the hopper inlet. Although this device was quite successful and is used extensively at the present time, it has certain limitations, such as for example the fact that the compressed feed is not broken up and re-mixed with the bulk feed in the hopper after having been compressed by the gates.

The present invention provides as its major objective a unique new mechanism for resolving the stated problems in a new and unique manner. It greatly facilitates the re-entry of feed from the conveyor trough into the hopper by positively assisting the motion of the feed, thereby preventing both the piling-up of feed as well as the backing-up thereof within the conveyor trough at the hopper inlet. The inventive device further serves to agitate the feed re-entering the hopper with the supply of bulk feed already in the hopper, thereby in some cases helping to maintain a thoroughly mixed feed. The new apparatus is, in addition, strong and durable in operation and very dependable mechanically.

The foregoing important objectives and advantages of the present invention, together with other equally desirable features pertaining thereto, will become increasingly apparent by those acquainted with the design and use of automatic poultry feeding equipment upon consideration of the following specification and its appended claims, when taken in conjunction with the accompanying illustrative drawings setting forth a preferred embodiment of the invention.

Figure 2:
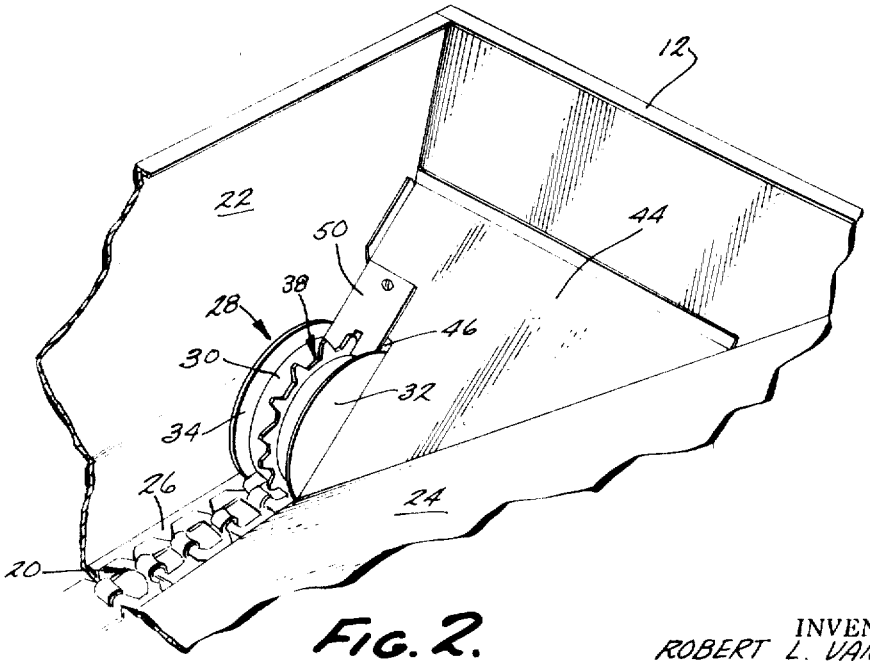

In the drawings:

FIG. 1 is a fragmentary, generally central sectional view of a hopper having the novel feed saver installed therein; and FIG. 2 is a fragmentary perspective view showing other details of the apparatus of FIG. 1.

Briefly stated, the present invention provides a new hopper structure for use in automatic feeding equipment, or more precisely, a new and unique structure for use in the supply hoppers of automatic feeding equipment to facilitate the re-entry of unconsumed feed back into the hopper from the returning conveyor mechanism of the automatic feeding equipment. Basically, this structure includes a cylindrical compacting element which is rotatably mounted immediately within the hopper inlet. The hopper itself is of the type having oppositely-disposed walls which converge toward each other at the bottom of the hopper to accommodate the passage therebetween of the conveyor means. The compacting element mounts normal to these walls and transversely across the moving member of the conveyor, which is preferably of the well-known chain variety. The compacting element has a centrally-disposed sprocket means, whose radially-extending teeth engage the moving links of the conveyor chain. This rotates the sprocket and the attached compacting element together, in unison with the chain. As the sprocket and compactor rotate around, toward their lowermost position and the conveyor chain, the compacting element contacts meets and compacts feed returning to the hopper. When the sprocket passes its bottom position and again starts upward about its axis of rotation, it moves the compacted quantity of feed upward into the mass of bulk feed already in the hopper, agitating the feed and mixing it together.

Referring now in more detail to the drawings the lower portion of the upstream end of the feed supply hopper 10 is shown in FIG. 1, as defined by the upstream end wall 12 and the bottom 14 of the hopper. The feeder trough is shown at 16 in this figure where it returns to the inlet 18 of the hopper, which is formed in the end wall 12. As the drawings illustrate, the feeder trough 16 contains a conveyor mechanism, and this is preferably of the flat chain variety, shown at 20.

The hopper 10 is more clearly shown in FIG. 2, where it is seen that the hopper is basically an enclosure having oppositely-disposed sides 22 and 24 which converge toward each other from top to bottom to form a generally flat horizontal portion 26 at the bottom of the hopper which accommodates the conveyor chain 20 by guiding it between the converging walls. The upstream end 12 of the hopper is shown, in which the inlet is formed, and it is to be understood that a similar downstream end (not shown) is also provided (having an outlet, also not shown) to complete the hopper enclosure. FIG. 2 further illustrates the nature and the position of the feed-saving compacting and agitating structure 28 of the present invention.

The structure 28 includes a generally cylindrical compacting element 30, which is preferably a smooth metal drum. At each end of the element 30 is positioned a flat circular, disk-like plate 32 and 34, respectively. For simplicity of manufacture, the element 30 and the two plates 32 and 34 are preferably separate members which may be assembled into place by means of a concentric mounting aperture 36 which each component has at its axis of rotation. It is to be noted that the diameter of the two circular plates 32 and 34 is greater than that of the cylindrical element 30, and that together these three pieces form an annular channel-shaped confining structure extending around their circumference.

The compacting structure 28 also includes a sprocket means 38 having a regular series of radially-extending teeth 40. The sprocket means 38 is attached to the cylindrical element 30 about its circumference, approximately at its longitudinal mid-point, in such a way that these members are indexed together for simultaneous rotation.

The exact position in which the compacting structure 28 is mounted in the hopper 10 is shown in FIG. 1. Here it is seen that the structure 28 is mounted immediately inside the hopper inlet 18. The compactor 28 is rotatably mounted by its mounting aperture 36 upon suitable mounting posts 42 associated structurally with the hopper 10 in a desired manner. The exact nature of the mounting posts 42 is not critical, but the vertical position in which the structure 28 is mounted is important. This should be such that each of the teeth 40 of sprocket 38 will be engaged by one of the links in the moving conveyor chain 20, and the vertical position of the compacting structure should permit the sprocket to be rotated freely about its mount by the action of the conveyor chain against the teeth 40. The sprocket teeth should of course easily clear the upper surface of the bottom 14 of the hopper, but the teeth should nonetheless pass close enough to the bottom so that there is no chance whatever of the chain 20 moving past the compacting structure without engaging the extending teeth of the sprocket.

As now should be evident, the length of the cylindrical element 30 previously described should be such as to position its two circular end plates 32 and 34 at either side of the conveyor chain 20, so that the said end plates flank the chain. As FIG. 1 illustrates, the edges of the end plates should, like the sprocket teeth 40, extend substantially to the bottom 14 of the hopper, while the cylindrical surface of the element 30 rides immediately above the chain 20 as the latter passes thereunder. With the end plates 32 and 34 flanking the sides of the chain in the preferred manner, the sprocket means 38 will be located centrally of the chain 20, and each of its rotating teeth 40 will enter and engage each link in the chain near its center.

As is clearly seen in both FIGS. 1 and 2, an inclined plate 44 is positioned across the upstream end of the hopper 10. The plate 44 is basically triangular in shape, and one edge thereof attaches to the end wall 12 of the hopper at its upper extremity. From this point the plate inclines downward away from wall 12, in the direction of motion of the conveyor chain and toward the bottom of the hopper. In this position, the plate 44 is inclined over the top of the mounting posts 42 to cover both the latter and the mounting aperture 36 and the associated axial mounting structure of the compacting structure 28, together with the rear and bottom portions of the entire compacting structure 28 (see FIG. 1). The front portion of the compacting structure (i.e., that portion directed toward the downstream end of the hopper and its outlet opening) extends through a generally rectangular cut-away portion 46 in one side of the plate 44, into the inside of the hopper, which contains the supply of bulk feed 48. Other than this forward portion, the entire remainder of the compacting structure 28 is positioned below the inclined plate 44, in the vicinity of the hopper inlet 18.

Finally, a substantially rigid blade-like plate 50 is attached to the inclined plate 44 immediately above its cutaway portion 46 and extending into the latter. The blade 50 is aligned with the upper surface of the cylindrical element 30 of the compacting structure, and is held in position with the end of the blade very near to but not quite touching this surface. As may be seen in FIG. 2, the width of the blade 50 extends substantially the entire distance between the two end plates 32 and 34 of the compacting structure. The blade has a central opening formed therein which is just large enough to allow the sprocket teeth 40 to pass through it as the sprocket and the remainder of the compacting structure 28 are rotated by the conveyor chain. The blade 50 is preferably formed from sheet metal stock which, as stated, is substantially rigid, and the end extremity of the blade which is aligned with the cylindrical surface of element 30 is preferably somewhat sharpened.

OPERATION

Having fully described the structure of my invention, together with the inter-relationships of its assembly, the operation of the device will now be outlined. With the feeder in operation, the conveyor chain 20 is driven endlessly around a closed loop of feeder trough 16 to carry feed from the hopper 10 and distribute it throughout the trough. The quantity of feed which has not been eaten by the poultry after one complete cycle of the conveyor is returned to the chain 20 into the inlet 18 of the hopper. This feed must be reintroduced into the large mass of loose bulk feed 48 within the hopper and, if possible, agitated and mixed with the latter at the same rate it is returned to the hopper. There should be no piling up and spillage of feed whatever at the inlet 18, and neither should any of the feed 48 be allowed to work its way back to the inlet so as to spill and be wasted. The present invention accomplishes these purposes as follows.

As the conveyor chain 20 moves from left to right in FIG. 1, each of its links engage one of the sprocket teeth 40. This causes the sprocket and the entire compacting structure 28 to be steadily rotated in a counterclockwise direction. As this structure is so rotated, its cylindrical element 30 is steadily rolled into contact with the feed being carried by each particular link in the chain. Simultaneously, the end plates 32 and 34 move into flanking position at opposite sides of the chain. As the compacting structure and the chain continue their simultaneous movement, the surface of element 30 gradually and smoothly compacts the feed confined in the space between it and the two end plates. Further, the particular sprocket tooth that is moving into engagement with the conveyor chain is forced into the compacted feed in that link of chain. This further compacts the feed.

As the chain and compacting structure continue to move, the rotation of the sprocket disengages its tooth from the link of chain. The feed surrounding and compacted about the sprocket tooth remains in contact with the tooth, and thus is removed fro mthe link of chain. Normally, this compacted feed is then drawn tangentially away from the compacting structure and sprocket tooth into the mass of bulk feed 48 at this end of the hopper by the dragging effect of the feed against the sprocket tooth and the cylinder. The continuous movement of the outwardly-extending sprocket teeth through the bulk feed serves to steadily agitate the feed in the adjacent vicinity, and this also helps to remove the compacted feed from the rotating structure. Consequently, the feed which was first compacted is then broken up and thoroughly intermixed with the other feed in the hopper.

At times, however, the re-entering feed is so thoroughly compacted that it becomes firmly wedged into the channel-shaped confining area on the compacting structure. In order to remove it therefrom and prevent it from being carried completely around toward the inlet 18 of the hopper, where it would interfere with the operation of the device, the blade 50 is provided. As has been stated, the blade preferably has a somewhat sharpened lower extremity and is closely aligned with the upper portion of the cylindrical surface 30. Thus, it will be apparent that the blade 50 quickly and cleanly dislodges any compacted feed which does become lodged or otherwise stuck to the surface of the compactor structure at the point where it moves through the cut-away portion 46 of the inclined plate 44.

As FIG. 1 shows, the level of feed 48 in the hopper is normally well above the top of the compactor 28. Consequently, the agitation of feed noted previously, due to the rotation of the entire structure 28, occurs above this structure also, and the feed dislodged by the blades 50 is broken up and mixed with the bulk supply feed in the hopper in the same manner as feed moved or drawn away from the front of the compactor in the normal manner. In fact, the agitation of the bulk feed by the movement of the compactor is normally so brisk that even with the hopper completed filled, the top surface of the bulk feed will visibly move in a continuous boiling or stirring motion which testifies to the degree of thoroughness with which the feed is being mixed.

It will be observed from the foregoing description of the operation of the device that practically all feed which is returned by the conveyor to the hopper is compacted, removed from the chain, and mixed with feed already in the hopper. In performing in this manner, the rotating compacting structure 28 engages feed carried by the chain at its lowest point of rotation and moves this feed past the lower portion of the inclined plate 44 directly into the interior of the hopper. As the compacting structure is rotated through the bulk feed in the hopper and passes beyond the upper portion of the inclined plate 44, the action of the blade 50 positively assures the compactor of moving past the plate 44 and toward the chain 20 free of any residual feed. Further, since the inclined plate 44 acts to retain the supply of bulk feed 48 in the hopper, there is no way in which feed from the hopper can be formed or can otherwise find its way back to the inlet

18 of the hopper. Consequently, the inlet area remains free of any piled feed, and there is no backing up and spilling of feed therefrom.

It will thus be seen that the present invention completely and effectively solves the problem to which it is addressed by means of a durable structure which requires no additional or extra motive power and which in fact produces an added desirable feature in continuously agitating the supply feed in the hopper. The structure of the compacting device is relatively simple to manufacture and assemble, has extremely long life, and requires practically no maintenance.

While I have illustrated and described the embodiment of this invention most preferred by me, it will be understood that various modifications and alterations in the structural details of the invention may be provided without departing from the spirit of the invention and while continuing to utilize the concept underlying it. Consequently, all such alterations and modifications are to be considered a part of the invention unless the claims appended below by their language expressly state otherwise.

I claim:

1. Apparatus for returning feed back into the inlet of a bulk feed hopper from a trough in which a conveyor member travels to transfer feed from the hopper throughout the length of the trough, said apparatus comprising: a cylindrical compacting element *of substantially circular cross section*; means for mounting said element within said hopper at its said inlet; said means mounting said element for rotation about its longitudinal axis at a predetermined height above said conveyor member; means extending outwardly beyond the surface of said compacting element for engaging said traveling conveyor member and driving said element in a rotary manner; said element rolling against and compacting feed above said predetermined height which is being returned to said hopper in said trough; said extending means moving the compacted feed upward into said hopper as it rotates; and means effectively shielding the upper and rear portions of said compacting element and extending means to prevent feed in the hopper from returning to the said trough upstream of said hopper inlet.

2. Apparatus for returning feed back into the inlet of a bulk feed hopper from a trough in which a conveyor member travels to transfer feed from the hopper throughout the length of the trough, said apparatus comprising: a cylindrical compacting element *of substantially circular cross section*; means for mounting said element within said hopper at its said inlet; said means mounting said element for rotation about its longitudinal axis at a predetermined height above said conveyor member; a plurality of means extending outwardly beyond the surface of said compacting element for engaging said traveling conveyor member and driving said element in a rotary manner; said element rolling against and compacting feed above said predetermined height which is being returned to said hopper in said trough; said extending means moving the compacted feed upward into said hopper as it rotates; a rigid, stationary blade structure extending from the upstream end of said trough toward the upper portions of said compacting element and in alignment therewith for dislodging compacted feed therefrom; and shielding means for preventing said dislodged feed and other feed in the said hopper from traveling with the compacting element or otherwise entering the said trough upstream of said hopper inlet.

3. Apparatus for returning feed back into the inlet of a bulk feed hopper from a trough in which a flat chain conveyor travels to transfer feed from the hopper throughout the length of the trough, said apparatus comprising: a cylindrical compacting element *of substantially circular cross section*; means for mounting said element within said hopper at its said inlet; said means mounting said element for rotation about its longitudinal axis at a predetermined height above said conveyor chain; a sprocket means attached to said compacting element approximately centrally thereof for engaging said conveyor chain and driving said element in a rotary manner; said element rolling against and compacting feed above said predetermined height which is being returned to said hopper in said trough; said sprocket moving said compacted feed upward into said hopper as the sprocket and compacting element are rotated; and means effectively shielding the upper and rear portions of said compacting element and sprocket means to prevent feed in the hopper from traveling with the compacting element and sprocket or otherwise entering the said trough upstream of said hopper inlet.

4. Apparatus for returning feed back into the inlet of a bulk feed hopper from a trough in which a flat chain conveyor travels to transfer feed from the hopper throughout the length of the trough, said apparatus comprising: a cylindrical compacting element *of substantially circular cross section*; means for mounting said element within said hopper at its said inlet; said means mounting said element for rotation about its longitudinal axis at a predetermined height above said conveyor chain; a sprocket means attached to said compacting element approximately centrally thereof for engaging said conveyor chain and driving said element in a rotary manner; said element rolling against and compacting feed above said predetermined height which is being returned to said hopper in said trough; said sprocket moving said compacted feed upward into said hopper as the sprocket and compacting element are rotated; a rigid, stationary blade structure extending from the upstream portion of said trough toward the upper portions of said compacting element and in alignment therewith for dislodging compacted feed therefrom; and shielding means for preventing said dislodged feed and other feed in the said hopper from traveling with the compacting element and sprocket means or otherwise entering the said trough upstream of said hopper inlet.

5. Apparatus for returning feed back into the inlet of a bulk feed hopper from a trough in which a flat chain conveyor travels to transfer feed from the hopper throughout the length of the trough, said apparatus comprising: a cylindrical compacting element; means for mounting said element within said hopper at its said inlet; said means mounting said element for rotation about its longitudinal axis at a predetermined height above said conveyor chain; a generally flat circular flange means [at] *secured to* each end of said cylindrical compacting element *for rotation therewith*; said flange means having a diameter greater than that of said element and extending radially outwardly beyond same to form a channel structure therebetween; a sprocket means attached to said compacting element generally centrally thereof for engaging said conveyor chain and driving said element in a rotary manner; said element rolling against and compacting any feed above said predetermined height within said channel structure as the compacting element rotates; said sprocket moving said compacted feed upward into said hopper as the sprocket and compacting element are rotated; a rigid, stationary blade structure extending from the upstream portion of said trough toward the upper portions of said compacting element and in alignment therewith for dislodging compacted feed from said channel; and shielding means for preventing said dislodged feed and other feed in the said hopper from traveling with the compacting element and sprocket means or otherwise entering the said trough upstream of said hopper inlet.

6. A feed hopper for use in automatic feeding equipment in which a conveyor means transfers feed from the outlet of the hopper throughout a feeding trough and returns through the inlet of the hopper for a continuous supply of feed, said hopper comprising in combination: an enclosure having at least two of its opposite sides arranged to converge toward each other and closely accommodate said conveyor means as the same passes therebetween; a cylindrical compacting element *of substantially circular cross section* rotatably mounted within said hopper at its inlet; said element being positioned with its axis of rotation substantially normal to said converging hopper sides and conveyor means and at a predetermined height above the latter; a plurality of means extending outwardly beyond the surface of said compacting element for engaging said traveling conveyor means to drive said element in a rotary manner; said element rolling against and compacting feed above said predetermined height which is being returned to said hopper in said trough; said extending means moving the compacted feed upward into said hopper as the said means rotate; and an angle plate at the inlet end of the hopper for effectively shielding the upper and rear portions of said compacting element and extending means to prevent feed in the hopper from traveling with the compacting element or otherwise entering the said trough upstream of said hopper inlet.

7. A feed hopper for use in automatic feeding equipment in which a flat chain conveyor transfers feed from the outlet of the hopper throughout a feeding trough and returns through the inlet of the hopper for a continuous supply of feed, said hopper comprising in combination: an enclosure having at least two of its opposite sides arranged to converge toward each other and closely accommodate said conveyor as the same passes therebetween; a cylindrical compacting element *of substantially circular cross section* rotatably mounted within said hopper at its inlet; said element being positioned with its axis of rotation substantially normal to said converging hopper sides and conveyor chain and at a predetermined height above the latter; a sprocket means attached to said compacting element approximately centrally thereof for engaging said conveyor chain to drive said element in a rotary manner; said element rolling against and compacting feed above said predetermined height which is being returned to said hopper in said trough; said sprocket moving said compacted feed upward into said hopper as the sprocket and compacting element rotate; a rigid, stationary blade structure extending from the upstream portion of said hopper toward the upper portions of said compacting element and in alignment therewith for dislodging compacted feed therefrom; and an angle plate at the said inlet end of the hopper for preventing said dislodged feed and other feed in the said hopper from traveling with the compacting element and sprocket means or otherwise entering the conveyor trough upstream of said hopper inlet.

8. A feed hopper for use in automatic feeding equipment in which a flat chain conveyor transfers feed from the outlet of the hopper throughout a feeding trough and returns through the inlet of the hopper for a continuous supply of feed, said hopper comprising in combination: an enclosure having at least two of its opposite sides arranged to converge toward each other and closely accommodate said conveyor as the same passes therebetween; a cylindrical compacting element rotatably mounted within said hopper at its inlet; said element being positioned with its axis of rotation substantially normal to said converging hopper sides and conveyor chain and at a predetermined height above the latter; a generally flat circular flange means [at] *secured to* each end of said cylindrical compacting element; said flange means having a diameter greater than the said element *for rotation therewith* and extending radially outwardly beyond same to form a channel structure therebetween; a sprocket means attached to said compacting element generally centrally thereof for engaging said conveyor chain to drive said element in a rotary manner; said element rolling against and compacting any feed above said predetermined height within said channel structure as the compacting element rotates; said sprocket moving said compacted feed upward into said hopper as the sprocket and compacting element rotate; a rigid, stationary blade structure extending from the upstream portion of said hopper toward the upper portions of said compacting element and in alignment therewith for dislodging compacted feed from said channel; and an angle plate at the said inlet end of the hopper for preventing said dislodged feed and other feed in the said hopper from traveling with the compacting element and sprocket means or otherwise entering the conveyor trough upstream of said hopper inlet.

*9. Apparatus for returning feed back into the inlet of a bulk feed hopper from a trough in which a conveyor member travels to transfer feed from the hopper throughout the length of the trough, said apparatus comprising: a cylindrical compacting element; means for mounting said element of substantially circular cross section within said hopper at its said inlet; said means mounting said element for rotation about its longitudinal axis at a predetermined height above said conveyor member; means for driving said element in a rotary manner; said element rolling against and compacting feed above said predetermined height which is being returned to said hopper in said trough; said element moving the compacted feed upward into said hopper as it rotates; and means effectively shielding the upper and rear portions of said compacting element to prevent feed in the hopper from returning to the said trough upstream of said hopper inlet.*

*10. The apparatus of claim 9 in which the means for driving said element engages said traveling conveyor member.*

*11. The apparatus of claim 9 in which there is provided a rigid, stationary blade structure extending from the upstream end of said trough toward the upper portions of the said compacting element and in alignment therewith for dislodging compacted feed therefrom; said shielding means for preventing said dislodged feed and other feed in the said hopper from traveling with the compacting element or otherwise entering the said trough upstream of said hopper inlet.*

*12. The apparatus of claim 9 in which the means for driving said element is a sprocket means located approximately on a plane perpendicular to the axis of rotation of said element and bisecting the said element.*

*13. The apparatus of claim 11 in which the means for driving said element is a sprocket means located approximately on a plane perpendicular to the axis of rotation of said element and bisecting the said element.*

*14. Apparatus for returning feed back into the inlet of a bulk feed hopper from a trough in which a flat chain conveyor travels to transfer feed from the hopper throughout the length of the trough, said apparatus comprising: a cylindrical compacting element; means for mounting said element within said hopper at its said inlet; said means mounting said element for rotation about its longitudinal axis at a predetermined height above said conveyor chain; a generally flat circular flange means secured to each end of said cylindrical compacting element for rotation therewith; said flange means having a diameter greater than that of said element and extending radially outwardly beyond same to form a channel structure therebetween; a sprocket means operatively connected to said compacting element and driving said element in a rotary manner; said element rolling against and compacting any feed above said predetermined height within said channel structure as the compacting element rotates; said sprocket means causing said compacting element to move said compacted feed upward into said hopper as the sprocket and compacting element are rotated; a rigid, stationary blade structure extending from the upstream portion of said trough toward the upper portions of said compacting element and in alignment therewith for dislodging compacted feed from said channel; and shielding means for preventing said dislodged feed and other feed in the said hopper from traveling with the compacting element and sprocket means or otherwise entering the said trough upstream of said hopper inlet.*

*15. The apparatus of claim 14 in which the means for driving said element engages said traveling conveyor member.*

*16. The apparatus of claim 14 in which the means for driving said element is a sprocket means located approximately on a plane perpendicular to the axis of rotation of said element and bisecting the said element.*

References Cited

The following references, cited by the Examiner, are of record in the patented file of this patent or the original patent.

UNITED STATES PATENTS

| | | | |
|---|---|---|---|
| 247,615 | 9/1881 | Coleman | 222—414 |
| 2,589,690 | 3/1952 | Graetz | 198—53 |
| 2,985,302 | 5/1961 | Brands | 119—52 |
| 3,058,571 | 10/1962 | Emrick | 119—52 |

ROBERT B. REEVES, Primary Examiner

H. S. LANE, Assistant Examiner